UNITED STATES PATENT OFFICE.

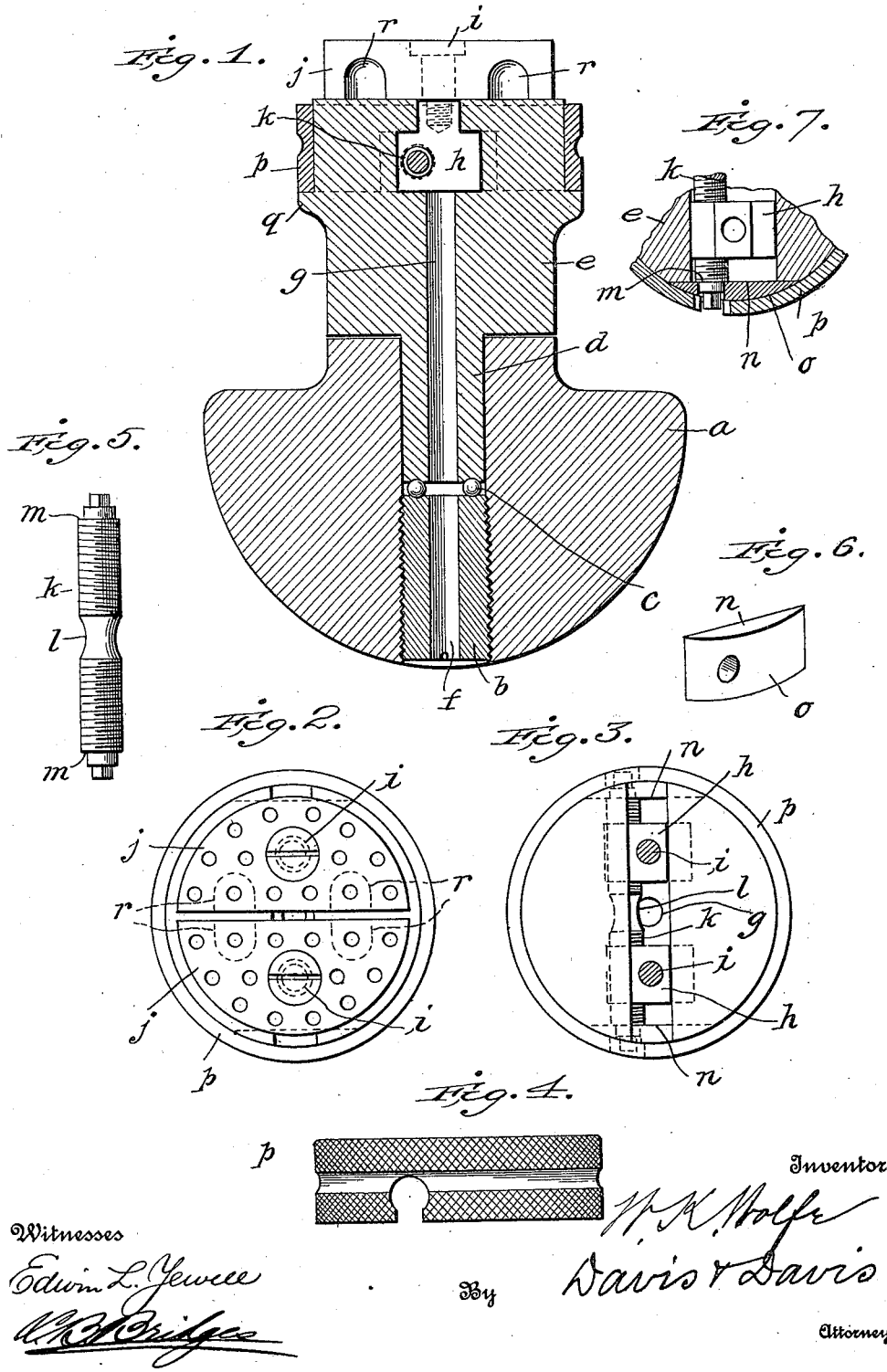

WILLIAM K. WOLFE, OF CHARLOTTE, NORTH CAROLINA.

ENGRAVER'S BLOCK.

1,006,817. Specification of Letters Patent. Patented Oct. 24, 1911.

Application filed November 29, 1910. Serial No. 594,755.

*To all whom it may concern:*

Be it known that I, WILLIAM K. WOLFE, a citizen of the United States of America, and a resident of Charlotte, in the county of Mecklenburg and State of North Carolina, have invented certain new and useful Improvements in Engravers' Blocks, of which the following is a full and clear specification, reference being had to the accompanying drawings, in which—

Figure 1 is a vertical sectional view of my block complete; Fig. 2 a plan view thereof; Fig. 3 a plan view with the jaws removed, the swivel screws thereof being shown in horizontal section; Fig. 4 a side elevation of the inclosing ring on the rotatable block or head; Fig. 5 a detail side elevation of the double screw for adjusting the jaw blocks or nuts; Fig. 6 a detail perspective view of one of the stop or thrust plates for the screw; and Fig. 7 a detail horizontal section showing one of the thrust plates or stops in position.

The object of this invention is to simplify and improve the engraver's block, and the invention consists of certain novel features of construction hereinafter described and claimed.

In the drawing, *a* designates the base which is circular in shape and has its under side rounded to a perfect half sphere so that the proper angle will be maintained in all positions of the block. Centrally through the block is formed a passage and into the lower end of this passage is screwed a block *b* which is hollow and which at its upper end is provided with an annular groove to form a race-way for a circular series of balls *c*. Depending into the upper part of this passage is a cylindrical stem *d* depending from the head block *e*, and the lower face of this stem *d* is provided with an annular groove to form the upper half of the race-way of said balls *c*, whereby the head *e* is mounted upon a substantial bearing of an anti-friction nature. The screw *b* is adjustable vertically in order to obtain the proper relation of the rotary head and the base. The screw *b* is provided with a central longitudinal passage *f* extending entirely through it, and this passage is in alinement with a central passage *g* extending through the head and its extension *d*.

In a transverse channel or slot formed in the upper face of the head is mounted a pair of T-shaped nuts *h* which in vertical section are shaped to fit the channel or slot. Screwed down into the upper ends of these nuts is a fillister screw *i*, and on the upper end of each of these screws is swiveled a semi-circular jaw *j* which rests upon the upper flat face of the head and extends across the slot therein. Extending longitudinally through the slot in the head is a screw *k* which is provided at each end with a squared projection for the reception of a suitable key and which is threaded in opposite directions at opposite sides of its center. The nuts *h* are threaded upon respective ends of these screws, so that when the screw is turned in one direction the nuts will approach each other and in the other direction will be spread apart. The screw *k* passes through the nuts at one side of the centers thereof and is provided with an annular groove *l*, whereby this screw will be prevented from obstructing the vertical passage *g* down through the head block.

At each end of the screw it is provided with an annular shoulder *m* which abuts against the inner flat face of a plate *n* which extends across the end of the slot in the head and has its outer face *o* rounded to conform to the cylindrical shape of the head. These abutment plates *n* are entirely covered and held in place by a ring or sleeve *p* which is fitted snugly on the cylindrical upper portion of the head and bears against an annular shoulder *q* on the head. This ring may have its exterior roughened or knurled to form a finger hold to facilitate the rotation of the head. This ring by clasping the abutment plates *n* and holding them against the sides of the head block, serves to hold all the parts in position, and it will be observed that by simply slipping this ring vertically off the head all the working parts may be readily removed from the head for the purpose of cleaning and repair.

It will be observed that the key-ends of the screw project into openings *k'* in the ring *p*, in order to give access to said key-ends, but this does not prevent the ring *p* being slipped off the head vertically as these openings *k'* are in reality notches formed in the lower edge of the ring.

By having both the jaws swiveled, it will be observed that they readily adjust themselves to irregular pieces of work, and by providing the adjacent faces of both jaws at opposite sides of the center with under cut recesses *r* the jaws are adapted to receive and hold two cuff links or buttons at the same time. By forming a central passage through the head and the screw plug and mounting the clamp screw at one side of the center, it will be observed that the device is adapted to receive the pin of a hat pin while the head is being worked upon.

It will be observed that this device is very simple in construction and inexpensive to manufacture and that it may be cleaned and repaired readily.

Having thus fully described my invention, what I claim as new and desire to secure by Letters Patent, is—

1. The combination of a base, a head mounted thereon and having its upper end made cylindrical with an annular shoulder below the cylindrical portion, an annular band removably fitted down on said cylindrical portion and having notches $a'$ at its opposite sides in its lower edge, a screw mounted in a transverse slot in the upper face of the head, nuts on this screw and jaws carried by the nuts, said screw being shouldered at its ends and provided with an angular extension extending into the aforesaid notches, and removable abutment plates between the inner face of the band and the shoulders on the screw, substantially as described.

2. The combination of a base, a rotatable head mounted thereon and slotted transversely in its upper face, a screw mounted in said slot, a pair of nuts on said screw, a pair of jaws carried by said nuts, a pair of removable plates $n$ abutting against the ends of said screws and bearing against the opposite sides of the head and rounded to conform to the curvature of the head, said plates being provided with holes through which the ends of the screw pass, and a removable band or sleeve frictionally surrounding the head and holding said abutment plates in position and provided with notches in its lower edge for the reception of the projecting ends of said screw.

In testimony whereof I hereunto affix my signature in the presence of two witnesses this 28 day of Nov. 1910.

W. K. WOLFE.

Witnesses:
J. B. WYLIE,
J. L. McCLINTOCK.

Copies of this patent may be obtained for five cents each, by addressing the "Commissioner of Patents, Washington, D. C."